Nov. 19, 1935. S. T. PAYNE 2,021,326
RETRACTABLE LANDING GEAR
Filed Aug. 7, 1933 2 Sheets-Sheet 1
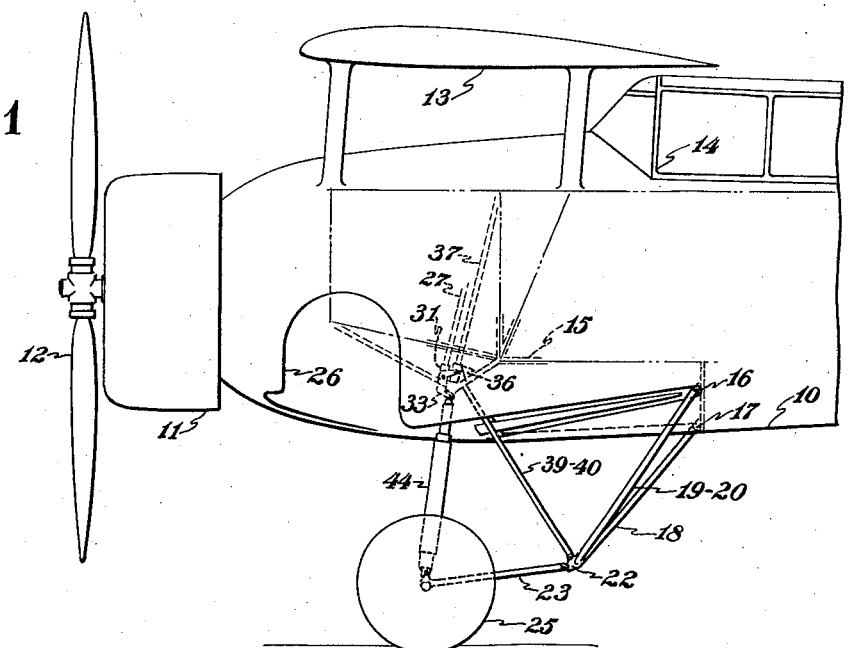
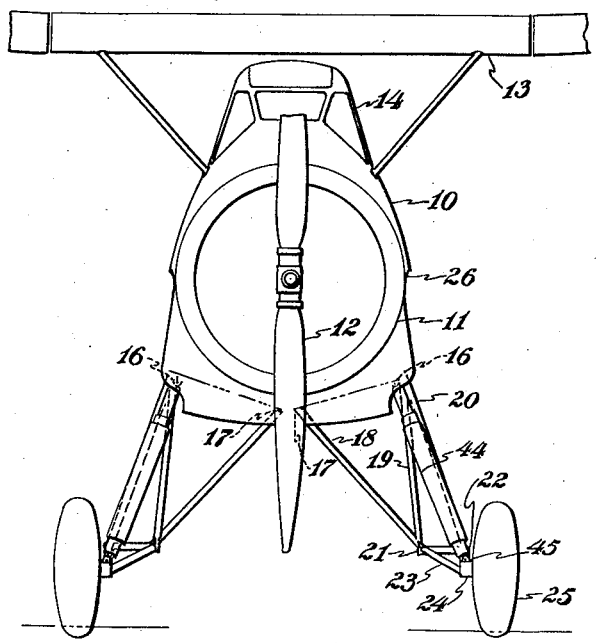
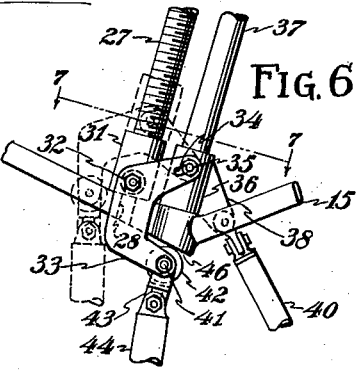
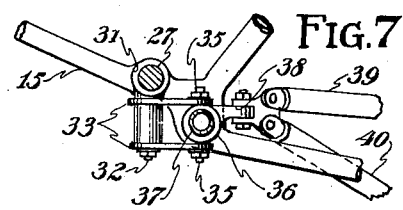
INVENTOR
SAMUEL T. PAYNE.
BY HIS ATTORNEY

INVENTOR.
SAMUEL T. PAYNE.
BY
ATTORNEYS.

Patented Nov. 19, 1935

2,021,326

UNITED STATES PATENT OFFICE 2,021,326

RETRACTABLE LANDING GEAR

Samuel T. Payne, Kenmore, N. Y., assignor to Curtiss Aeroplane & Motor Company Inc., a corporation of New York Application August 7, 1933, Serial No. 683,960

4 Claims. (Cl. 244—2)

This invention relates to improvements in retractable landing gears for aircraft and more particularly, provides a retractable landing gear structure wherein the landing wheels are adapted to be moved from a position below and spaced from an airplane fuselage upwardly, inwardly and forwardly to occupy suitable recesses formed in the sides of the airplane fuselage.

An object of the invention is to provide a landing gear structure wherein the heavier portions of the landing gear have relatively small movement fore and aft, whereby the center of gravity of the aircraft when the gear is either extended or retracted, is changed but little.

A further object is to provide a landing gear structure which, in its retracted position, is wholly enclosed within the steamline contour of the airplane fuselage.

A further object is to provide a plurality of pivoted struts in the landing gear structure, so arranged that the landing wheels may be slightly tilted upon retraction so that their plane is flush or parallel to the fuselage skin, thus minimizing obstructions to air flow over the fuselage and enabling the lines of the fuselage to be maintained in a desirable streamline contour.

An additional object is to provide an automatic locking mechanism which, when the landing gear is extended, will allow the principal landing stresses to be transmitted to the airplane by direct compressive contact between one of the landing gear struts and the airplane fuselage.

Briefly, the landing gear comprises two more or less independent units on each side of the plane of symmetry of the airplane. A frame is pivoted on the fuselage to swing upwardly and forwardly to a retracted position, a strut for this retraction joining the free end of the frame with a lead screw retracting mechanism. A subframe is pivoted at the free end of the main frame on an axis angled with respect to the frame axis, said sub-frame carrying the landing wheel. A shock absorbing strut joins the sub-frame adjacent the wheel axis with the lead screw retracting mechanism. The angles of the several axes are so arranged that the wheel when extended is spaced from the airplane plane of symmetry, while when the landing gear is retracted, the wheel is drawn inwardly, upwardly and forwardly to occupy a suitable recess in the fuselage. Mechanism is provided on the lead screw so that the shock absorber strut, when the landing gear is fully extended, is adapted to bear directly on the fuselage. Upon initiation of the retracting motion, the upper end of the shock absorbing strut is drawn away from the fuselage so that the whole landing gear may be withdrawn.

For a clearer understanding of the invention, reference may be made to the drawings, in which similar numbers indicate similar parts, and in which:

Fig. 1 is a side elevation of the forward portion of an airplane showing the landing gear in its extended position;

Fig. 2 is a front elevation of the airplane with the landing gear extended;

Fig. 6 is an enlarged detail of a portion of the retracting mechanism; and

Fig. 7 is a section on the line 7—7 of Fig. 6.

Figure 3:
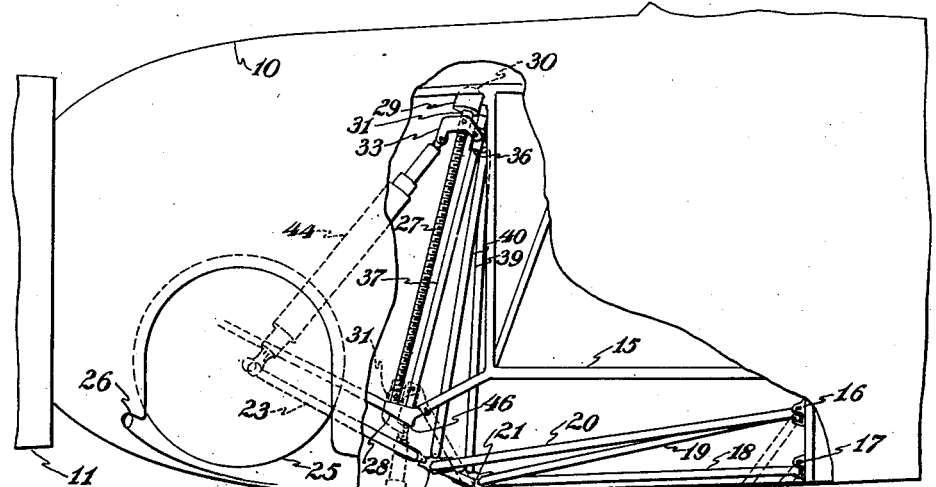
Fig. 3 is a fragmentary side elevation of a portion of the airplane with the landing gear retracted.

In Figs. 1 to 5, inclusive, 10 is an airplane fuselage having at its forward end a conventional engine cowling 11 within which the engine is contained, said engine having a tractive propeller 12. The fuselage carries the usual wing 13 and is provided with a cockpit 14 for the accommodation of the crew. The fuselage structure, generally designated as 15, is provided, rearwardly of the wing 13, with pairs of spaced pivots 16 and 17 on each side of the plane of symmetry of the airplane. As each half of the landing gear is identical with the other half, except in opposite phase, only one unit of the landing gear will be described, such description being deemed adequate to cover both halves of the structure.

The pivots 16 and 17 provide an axis extending laterally and upwardly from the fuselage. These pivots carry an N frame including a member 18 carried by the pivot 17, and members 19 and 20 carried by the pivot 16. At their forward ends, the members 18 and 19 join to provide a pivot 21, while the member 20 is provided with a pivot 22. The pivots 21 and 22 are aligned and provide an axis which is angled with respect to the axis of the pivots 16 and 17. As may be seen in Fig. 3, the axis of the pivots 21 and 22, when the landing gear is extended, is parallel to a transverse axis of the aircraft. However, when the frame consisting of the members 18, 19 and 20 is in its retracted position, the axis of the pivots 21 and 22 is upwardly and forwardly tilted with respect to a transverse axis of the aircraft, by virtue of the angularity of the pivots 16 and 17.

Figure 5:
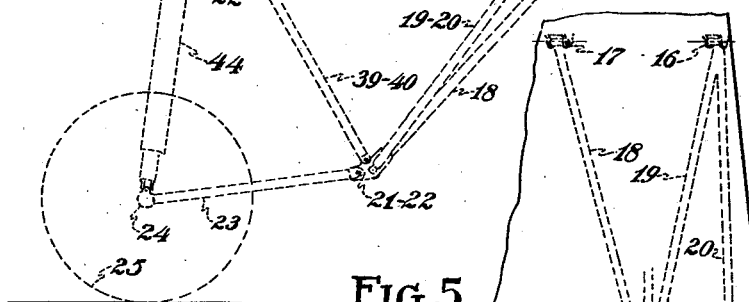
Fig. 5 is a fragmentary plan of the airplane with the landing gear retracted.
Figure 4:
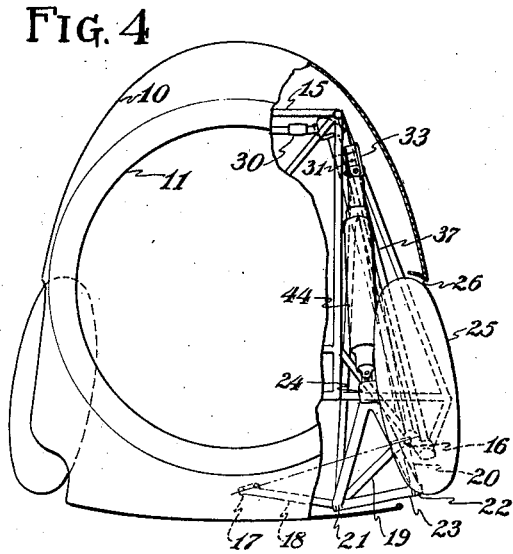
Fig. 4 is a fragmentary front elevation of the airplane with the landing gear retracted.

A triangular frame 23 is carried on the pivots 21 and 22, the apex of the frame 23 being provided with a wheel axle 24 on which is carried a wheel 25. The mechanism for retracting the frame 23, which may be termed a sub-frame, along with the wheel 25 and the frame consisting of the members 18, 19 and 20, will shortly be described. However, Figs. 3, 4 and 5 show the position of the frames and wheel when retracted, and it will be noted that by the angularity of the axes of the pivots 16 and 17, and 21 and 22, the wheel is adapted to move when retracted, upwardly, forwardly and inwardly toward the fuselage. At the same time, the plane of the wheel is tilted so that when fully retracted, the wheel is so arranged that its upper edge is tilted inwardly, and its forward edge is also tilted inwardly. It is adapted to lie in a recess 26 in the fuselage 10, so that the outer surface of the wheel forms substantially a flush continuation of the external contour of the fuselage. Thus, parasite drag when the landing gear is retracted is minimized; the fuselage may be designed to have the most desirable streamline form, while the pivot axes above referred to may be so arranged that the wheel lies parallel to the fuselage contour at that point of the fuselage where the wheel is arranged to lie in its retracted position. It will also be noted, as shown in Figs. 1 and 3, that the fore and aft travel of the wheel and landing gear structure is relatively small between the fully extended and fully retracted positions. Thus, the change in center of gravity of the airplane as a whole, as affected by the landing gear, is relatively small when the landing gear is retracted. In fact, the change in the fore and aft position of the landing gear is such that the center of gravity tends to advance when the landing gear is retracted and to move rearwardly when the landing gear is extended. This movement, though slight, is a desirable flying characteristic, since the weight distribution when the landing gear is extended would tend to be slightly aft, tending to cause the plane to fly slightly tail heavy. This tendency is counteracted by the actual drag occasioned when the landing gear is extended, since the wind pressure against the extended landing gear tends to produce a turning couple, causing the airplane to fly nose heavy. The two tendencies of nose heaviness and tail heaviness may be arranged to counteract each other, so that practically no change in trim of the airplane occurs when the gear is either extended or retracted.

The retracting mechanism includes a substantially vertical lead screw 27 held at its lower end in a bearing 28 and at its upper end in a bearing 29. Conventional mechanism, such as 30, may be provided at the upper end of the lead screw for turning it under the control of the aircraft crew. A nut 31 carries a pivot 32 at right angles to the nut axis on which a pair of fittings or brackets 33 may swing. These brackets are shaped somewhat as a U, and the pivot 32 engages the brackets at the bottom and to one side of the U, the latter being inverted. At the rearward end of the brackets 33, slots 34 are provided which engage studs 35 extending outwardly from a sleeve 36 arranged to slide on a guide 37 which extends parallel to the lead screw 27. Said sleeve also carries a fitting 38 to which are hinged a pair of struts 39 and 40 extending downwardly, respectively, to the pivots 21 and 22. The other end of the U-shaped bracket 33 is provided with a pivot 41 carrying a roller 42 in turn carrying a fitting 43 which engages the upper end of a resilient shock absorbing strut 44, the lower end of which strut is pivoted as at 45 to the wheel axle 24. Immediately below the guide 37, where it is anchored to the fuselage 15, an abutment 46 is provided against which the roller 42 bears when the landing gear is fully extended. By reference to Figs. 6 and 7, the operation of the device may be understood. When the landing gear is in its fully extended position, the brackets 33 and the struts 40 and 44 and associated mechanism will occupy the position shown in solid lines in Fig. 6. Therein, landing shocks imposed on the shock absorber strut 44 are transmitted through the fitting 43 and the roller 42 to the abutment 46 and thence to the fuselage. The nut 31 in this position is at its lowermost position, thus holding the sleeve 36 also in its lowermost position and holding the struts 40 against any movement. Upon initiation of retracting movement, wherein the lead screw 27 is turned to raise the nut 31, the brackets 33 are caused to swing in a clockwise direction about their pivot 32 on the nut 31, thus translating the strut 44 and the roller 42 forwardly and clear of the abutment 46. During such action, the slot 34 on the brackets 33 slides along the sleeve pivot 35. As soon as the roller 42 is clear of the abutment 46, and upon continued raising of the nut 31, the strut 44 and struts 39 and 40 are drawn upwardly to ultimately retract the whole landing gear within the fuselage. The extension of the landing gear is accomplished by reversal of rotation of the lead screw 27, and as the nut 31 approaches the lower end of the screw 27, the slot 34 slides along the pin 35, the sleeve 36 having reached the bottom before the nut. As turning of the lead screw is continued, the brackets 33 swing counter-clockwise about their pivots on the nut, ultimately forcing the roller 42 into contact with the abutment 46.

It will be noted that when the landing gear is fully extended, the frame consisting of the members 18, 19, 20, 39 and 40, constitutes a rigid structure. The unit consisting of the sub-frame 23 and the shock absorber strut 44, constitutes a resilient structure swingable about the pivots 21 and 22. Since the pivots 21 and 22 are parallel to the ground when the landing gear is extended, the wheel 25 is permitted to move in a vertical plane upon imposition of landing shocks thereon, the wheel swinging during such landing shock movement about the pivots 21 and 22.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft, a retractable landing gear including a frame hinged to said aircraft on a substantially transverse axis, a member pivoted at one end to the free end of said frame, means engaging the opposite end of said member for extending and retracting said frame and said member with respect to said aircraft, a strut extending forwardly from and pivoted at the juncture of said frame and said member, a wheel carried at the forward end of said strut, and shock absorbing means connecting said wheel with said retracting means.

2. In an aircraft, a retractable landing gear including a turnable lead screw, a nut adapted to traverse said screw upon turning thereof, a guide paralleling said screw having a sleeve slidable thereon, a fitting pivoted on said nut and having a lost motion connection with said sleeve, a pair of landing gear struts movable relative to each other and movable with respect to said aircraft, one said strut being hinged to said sleeve and the other said strut being hinged to said fitting, and an abutment against which said other strut is adapted to lie upon turning of said lead screw beyond the position wherein said sleeve reaches its limit of travel, whereby, through said lost motion connection, said fitting is turned relative to said nut to force said other strut end against said abutment and to bind said one strut and said sleeve from translation along said guide.

3. In an aircraft retractable landing gear, three struts pivoted at their ends to form a triangle, one of said struts being resiliently variable in length for the absorption of shocks, translatable means pivoted to one apex of said triangle for bodily moving the triangle into and from said aircraft, a landing wheel carried for rotation adjacent a second apex of said triangle, a radius strut pivotally connecting the third apex of said triangle with said aircraft for guiding said triangle in a fixed path upon movement of said translatable means, and means responsive to extension of said translatable means for effecting relative movement of the strut ends adjacent said first apex to lock said triangle in an extended position.

4. In an aircraft retractable landing gear, three struts pivoted at their ends to form a triangle, one of said struts being resiliently variable in length for the absorption of shocks, a guideway in said aircraft, a member translatable along said guideway to which one apex of said triangle is pivoted, said triangle being bodily movable with said member upon translation thereof, a landing wheel carried for rotation adjacent a second apex of said triangle, and a radius strut swingable relative to said aircraft and triangle and pivoted at its ends to said aircraft and to the third apex of said triangle for guiding said triangle in a fixed path upon movement of said translatable member.

SAMUEL T. PAYNE.